United States Patent [19]
Boyer et al.

[11] Patent Number: 6,002,934
[45] Date of Patent: *Dec. 14, 1999

[54] METHODS AND APPARATUS FOR ASSIGNING FREQUENCIES IN A CELLULAR NETWORK

[75] Inventors: Pete A. Boyer, Somerville; Pablo A. Vicharelli, Carlisle, both of Mass.; Alan B. Jennison, Zephyrhills, Fla.

[73] Assignees: GTE Laboratories Incorporated, Waltham, Mass.; GTE Mobilnet Service Corp., Atlanta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,187

[22] Filed: May 2, 1997

[51] Int. Cl.$^6$ .................................................. H04Q 7/36
[52] U.S. Cl. .......................... 455/447; 455/62; 455/450; 455/452; 455/509
[58] Field of Search .................................. 455/446–450, 455/451, 452, 453, 454–455, 509, 513, 514, 516, 62, 67.1, 561, 575, 550

[56] References Cited

U.S. PATENT DOCUMENTS

| | | | |
|---|---|---|---|
| 4,670,899 | 6/1987 | Brody | 455/453 |
| 5,038,399 | 8/1991 | Bruckert | 455/447 |

(List continued on next page.)

OTHER PUBLICATIONS

William C.Y.Lee — Mobile Cellular Telecommunications 1995 — pp. 266–281.

Manual Duque–Antón, Dietmar Kunz, Bernhard Rüber — Channel Assignment for Cellular Radio Using Simulated Annealing — 1993 pp. 14–21.

Frank Box — A heuristic Technique for Assigning Frequencies to Mobile Radio Nets — 1978 —pp. 57–64.

H. Sekiguchi et. al.—Techniques for Increasing Frequency Spectrum Utilization in Mobile Radio Communication System—1985 ogs 26–31.

Lewis G. Anderson—A simulation Study of Some Dynamic Channel Assignment Algorithms in a High Capacity Mobile Telecommunications System —Nov. 1973—pp. 210–217.

(List continued on next page.)

*Primary Examiner*—Doris H. To
*Attorney, Agent, or Firm*—Leonard Charles Suchyta

[57] ABSTRACT

A method and computerized apparatus for assigning frequencies to a plurality of cells in a cellular network. Each cell requires a predetermined number of frequencies. The method includes generating a difficulty factor for each cell, wherein each cell's difficulty factor is based on an adjustment factor for that cell, and wherein, following a first unsuccessful assignment attempt, each cell's adjustment factor is indicative of a relative level of difficulty in selecting frequencies for that cell during the first unsuccessful assignment attempt. The method further includes the steps of selecting a cell from the plurality of cells based on each cell's difficulty factor; selecting a frequency from the available frequencies for the selected cell; when at least one of the plurality of cells requires at least one more frequency and there is at least one frequency available for use by that cell, repeating the steps of generating a difficulty factor, selecting a cell and selecting a frequency; and when at least one of the plurality of cells requires at least one more frequency and there are no frequencies available for use by that cell, updating each cell's adjustment factor, unselecting all of the selected cells and all of the selected frequencies for the selected cells, and re-performing the steps of generating a difficulty factor, selecting a cell, selecting a frequency, as a second assignment attempt.

17 Claims, 15 Drawing Sheets

U.S. PATENT DOCUMENTS

| | | | |
|---|---|---|---|
| 5,134,709 | 7/1992 | Bi et al. | 455/452 |
| 5,148,548 | 9/1992 | Meche et al. | 455/62 |
| 5,355,367 | 10/1994 | Comroe et al. | 455/447 |
| 5,430,761 | 7/1995 | Bruckert et al. | 455/454 |
| 5,437,054 | 7/1995 | Rappaport et al. | 455/447 |
| 5,448,621 | 9/1995 | Knudsen | 455/452 |
| 5,603,085 | 2/1997 | Shedlo | 455/67.1 |
| 5,666,655 | 9/1997 | Ishikawa et al. | 455/452 |

OTHER PUBLICATIONS

Donald C. Cox et. al. —Increasing Channel Occupancy in Large–Scale Mobile Radio Systems: Dynamic Channel Reassignment—Jun. 1972—pp. 218–222.

Tomson Joe Kahua et.al.—A Hybrid Channel Assignment Scheme in Large–Scale, Cellular–Structured Mobile Communication Systems—1978—pp. 432–438.

Zuoying Xu et.al.—Virtually Fixed Channel Assignment For Cellular Radio–Telephone Systems: A Model and Evaluation—1992—pp. 1037–1041.

M. Grevel et. Al. —A Graph Theoretical Analysis of Dynamic Channel Assignment Algorithms for Mobile RadioCommunication Systems—a983—pp. 298–305.

Andreas Gamst, et al., "On Frequency Assignment in Mobile Automatic Telephone System," 1982, pp. 309–315, IEEE.

J. Plehn, "Applied Frequency Assignment," 1994, pp. 853–857, IEEE.

Kumar N. Sivarajan, et al., "Channel Assignment in Cellular Radio," 1989, pp. 846–850, IEEE.

FIRST ITERATION VALUES

|  | CELL A | CELL B | CELL C |
|---|---|---|---|
| MINIMUM SEPARATION REQUIREMENT | 1 | 3 | 1 |
| NUMBER OF FREQUENCIES NEEDED | 2 | 2 | 2 |
| FREQUENCIES AVAILABLE | w x y z | w x y z | w x y z |
| NUMBER OF FREQUENCIES AVAILABLE | 4 | 4 | 4 |
| ADJUSTMENT FACTOR | 0 | 0 | 0 |
| SCALE FACTOR (GLOBAL) | 1 | 1 | 1 |

FIG. 7

|  | CELL A | CELL B | CELL C |
|---|---|---|---|
| NUMBER OF FREQUENCIES NEEDED | 2 | 2 | 2 |
| FREQUENCIES ASSIGNED |  |  |  |
| FREQUENCIES AVAILABLE | w x y z | w x y z | w x y z |
| NUMBER OF FREQUENCIES AVAILABLE | 4 | 4 | 4 |
| DIFFICULTY FACTOR | $\frac{2+0}{4}$ | $\frac{2+0}{4}$ | $\frac{2+0}{4}$ |
| CELL SELECTED | X |  |  |
| FREQUENCY ASSIGNED TO SELECTED CELL | w |  |  |

FIG. 8

|  | CELL A | CELL B | CELL C |
|---|---|---|---|
| NUMBER OF FREQUENCIES NEEDED | 1 | 2 | 2 |
| FREQUENCIES ASSIGNED | w |  |  |
| FREQUENCIES AVAILABLE | w x y z | w x y z | w x y z |
| NUMBER OF FREQUENCIES AVAILABLE | 3 | 3 | 4 |
| DIFFICULTY FACTOR | $\frac{2+0}{4}$ | $\frac{2+0}{4}$ | $\frac{2+0}{4}$ |
| CELL SELECTED | X |  |  |
| FREQUENCY ASSIGNED TO SELECTED CELL | w |  |  |

FIG. 9

|  | CELL A | CELL B | CELL C |
|---|---|---|---|
| NUMBER OF FREQUENCIES NEEDED | 1 | 2 | 2 |
| FREQUENCIES ASSIGNED | w |  |  |
| FREQUENCIES AVAILABLE | w x y z | w x y z | w x y z |
| NUMBER OF FREQUENCIES AVAILABLE | 3 | 3 | 4 |
| DIFFICULTY FACTOR | $\frac{1+0}{3}$ | $\frac{2+0}{3}$ | $\frac{2+0}{4}$ |
| CELL SELECTED |  | X |  |
| CARRIER-TO-INTERFERENCE RATIOS |  | x   y   z<br>AB 1.0 1.0 1.0<br>BC 1.0 1.0 1.0 |  |
| FREQUENCY ASSIGNED TO SELECTED CELL |  | x |  |

FIG. 10

|  | CELL A | CELL B | CELL C |
|---|---|---|---|
| NUMBER OF FREQUENCIES NEEDED | ~~2~~ 1 | ~~2~~ 1 | 2 |
| FREQUENCIES ASSIGNED | w | x |  |
| FREQUENCIES AVAILABLE | ~~w~~ ~~x~~ y z | ~~w~~ ~~x~~ ~~y~~ ~~z~~ | w x y z |
| NUMBER OF FREQUENCIES AVAILABLE | ~~4~~ ~~3~~ 2 | ~~4~~ ~~3~~ 0 | 4 |
| DIFFICULTY FACTOR | $\frac{1+0}{3}$ | $\frac{2+0}{3}$ | $\frac{2+0}{4}$ |
| CELL SELECTED |  | X |  |
| CARRIER-TO-INTERFERENCE RATIOS |  | x   y   z<br>AB 1.0 1.0 1.0<br>BC 1.0 1.0 1.0 |  |
| FREQUENCY ASSIGNED TO SELECTED CELL |  | x |  |

FIG. 11

|  | CELL A | CELL B | CELL C |
|---|---|---|---|
| NUMBER OF FREQUENCIES NEEDED | ~~2~~ 1 | ~~2~~ 1 | 2 |
| FREQUENCIES ASSIGNED | w | x |  |
| FREQUENCIES AVAILABLE | ~~w~~ ~~x~~ y z | ~~w~~ ~~x~~ ~~y~~ ~~z~~ | w x y z |
| NUMBER OF FREQUENCIES AVAILABLE | ~~4~~ ~~3~~ 2 | ~~4~~ ~~3~~ 0 | 4 |
| DIFFICULTY FACTOR | $\frac{1+0}{2}$ |  | $\frac{2+0}{4}$ |
| CELL SELECTED |  |  | X |
| CARRIER-TO-INTERFERENCE RATIOS |  |  | w   x   y   z<br>AC 0.9 1.0 1.0 1.0<br>BC 1.0 0.8 1.0 1.0 |
| FREQUENCY ASSIGNED TO SELECTED CELL |  |  | y |

FIG. 12

|  | CELL A | CELL B | CELL C |
|---|---|---|---|
| NUMBER OF FREQUENCIES NEEDED | ~~2~~ 1 | ~~2~~ 1 | ~~2~~ 1 |
| FREQUENCIES ASSIGNED | w | x | y |
| FREQUENCIES AVAILABLE | ~~w~~ ~~x~~ y z | ~~w~~ ~~x~~ ~~y~~ ~~z~~ | w x ~~y~~ z |
| NUMBER OF FREQUENCIES AVAILABLE | ~~4~~ ~~3~~ 2 | ~~4~~ ~~3~~ 0 | ~~4~~ 3 |
| DIFFICULTY FACTOR | $\frac{1+0}{2}$ |  | $\frac{2+0}{4}$ |
| CELL SELECTED |  |  | X |
| CARRIER-TO-INTERFERENCE RATIOS |  |  | w  x  y  z<br>AC 0.9 1.0 1.0 1.0<br>BC 1.0 0.8 1.0 1.0 |
| FREQUENCY ASSIGNED TO SELECTED CELL |  |  | y |

FIG. 13

|  | CELL A | CELL B | CELL C |
|---|---|---|---|
| NUMBER OF FREQUENCIES NEEDED | ~~2~~ 1 | ~~2~~ 1 | ~~2~~ 1 |
| FREQUENCIES ASSIGNED | w | x | y |
| FREQUENCIES AVAILABLE | ~~w~~ ~~x~~ y z | ~~w~~ ~~x~~ ~~y~~ ~~z~~ | w x ~~y~~ z |
| NUMBER OF FREQUENCIES AVAILABLE | ~~4~~ ~~3~~ 2 | ~~4~~ ~~3~~ 0 | ~~4~~ 3 |
| DIFFICULTY FACTOR | $\frac{1+0}{2}$ |  | $\frac{1+0}{3}$ |
| CELL SELECTED | X |  |  |
| CARRIER-TO-INTERFERENCE RATIOS | y  z<br>AB 1.0 1.0<br>AC 0.9 1.0 |  |  |
| FREQUENCY ASSIGNED TO SELECTED CELL | z |  |  |

FIG. 14

|  | CELL A | CELL B | CELL C |
|---|---|---|---|
| NUMBER OF FREQUENCIES NEEDED | ~~2~~ ~~1~~ 0 | ~~2~~ 1 | ~~2~~ 1 |
| FREQUENCIES ASSIGNED | w z | x | y |
| FREQUENCIES AVAILABLE | ~~w~~ ~~x~~ y ~~z~~ | ~~w~~ ~~x~~ ~~y~~ ~~z~~ | w x ~~y~~ z |
| NUMBER OF FREQUENCIES AVAILABLE | ~~4~~ ~~3~~ ~~2~~ 1 | ~~2~~ ~~1~~ 0 | ~~4~~ 3 |
| DIFFICULTY FACTOR | $\frac{1+0}{2}$ |  | $\frac{1+0}{3}$ |
| CELL SELECTED | X |  |  |
| CARRIER-TO-INTERFERENCE RATIOS | y   z<br>AB 1.0 1.0<br>AC 0.9 1.0 |  |  |
| FREQUENCY ASSIGNED TO SELECTED CELL | z |  |  |

FIG. 15

|  | CELL A | CELL B | CELL C |
|---|---|---|---|
| NUMBER OF FREQUENCIES NEEDED | ~~2~~ ~~1~~ 0 | ~~2~~ 1 | ~~2~~ 1 |
| FREQUENCIES ASSIGNED | w z | x | y |
| FREQUENCIES AVAILABLE | ~~w~~ ~~x~~ y ~~z~~ | ~~w~~ ~~x~~ ~~y~~ ~~z~~ | w x ~~y~~ z |
| NUMBER OF FREQUENCIES AVAILABLE | ~~4~~ ~~3~~ ~~2~~ 1 | ~~2~~ ~~1~~ 0 | ~~4~~ 3 |
| DIFFICULTY FACTOR |  |  | $\frac{1+0}{3}$ |
| CELL SELECTED |  |  | X |
| CARRIER-TO-INTERFERENCE RATIOS |  |  | w   x   z<br>AC 0.9 1.0 0.9<br>BC 1.0 0.8 0.9 |
| FREQUENCY ASSIGNED TO SELECTED CELL |  |  | w |

FIG. 16

|  | CELL A | CELL B | CELL C |
|---|---|---|---|
| NUMBER OF FREQUENCIES NEEDED | ~~2~~ ~~1~~ 0 | ~~2~~ 1 | ~~2~~ ~~1~~ 0 |
| FREQUENCIES ASSIGNED | w z | x | y w |
| FREQUENCIES AVAILABLE | ~~w~~ ~~x~~ y ~~z~~ | ~~w~~ ~~x~~ ~~y~~ ~~z~~ | ~~w~~ x ~~y~~ z |
| NUMBER OF FREQUENCIES AVAILABLE | ~~4~~ ~~3~~ ~~2~~ 1 | ~~4~~ ~~3~~ 0 | ~~4~~ ~~3~~ 2 |
| DIFFICULTY FACTOR |  |  | $\frac{1+0}{3}$ |
| CELL SELECTED |  |  | X |
| CARRIER-TO-INTERFERENCE RATIOS |  |  | w   x   z<br>AC  0.9  1.0  0.9<br>BC  1.0  0.8  1.0 |
| FREQUENCY ASSIGNED TO SELECTED CELL |  |  | w |

FIG. 17

SECOND ITERATION VALUES

|  | CELL A | CELL B | CELL C |
|---|---|---|---|
| MINIMUM SEPARATION REQUIREMENT | 1 | 3 | 1 |
| NUMBER OF FREQUENCIES NEEDED | 2 | 2 | 2 |
| FREQUENCIES AVAILABLE | w x y z | w x y z | w x y z |
| NUMBER OF FREQUENCIES AVAILABLE | 4 | 4 | 4 |
| ADJUSTMENT FACTOR | -0.333 | 1.000 | -0.667 |
| SCALE FACTOR (GLOBAL) | 1 | 1 | 1 |

FIG. 18

|  | CELL A | CELL B | CELL C |
|---|---|---|---|
| NUMBER OF FREQUENCIES NEEDED | 2 | 2 | 2 |
| FREQUENCIES ASSIGNED |  |  |  |
| FREQUENCIES AVAILABLE | w x y z | w x y z | w x y z |
| NUMBER OF FREQUENCIES AVAILABLE | 4 | 4 | 4 |
| DIFFICULTY FACTOR | $\frac{2-0.333}{4}$ | $\frac{2+1}{4}$ | $\frac{2-0.667}{4}$ |
| CELL SELECTED |  | X |  |
| FREQUENCY ASSIGNED TO SELECTED CELL |  | w |  |

FIG.19

|  | CELL A | CELL B | CELL C |
|---|---|---|---|
| NUMBER OF FREQUENCIES NEEDED | 2 | ~~2~~ 1 | 2 |
| FREQUENCIES ASSIGNED |  | w |  |
| FREQUENCIES AVAILABLE | ~~w~~ x y z | ~~w~~ ~~x~~ ~~y~~ z | w x y z |
| NUMBER OF FREQUENCIES AVAILABLE | ~~4~~ 3 | ~~4~~ 1 | 4 |
| DIFFICULTY FACTOR | $\frac{2-0.333}{4}$ | $\frac{2+1}{4}$ | $\frac{2-0.667}{4}$ |
| CELL SELECTED |  | X |  |
| FREQUENCY ASSIGNED TO SELECTED CELL |  | w |  |

FIG. 20

|  | CELL A | CELL B | CELL C |
|---|---|---|---|
| NUMBER OF FREQUENCIES NEEDED | 2 | ~~2~~ 1 | 2 |
| FREQUENCIES ASSIGNED |  | w |  |
| FREQUENCIES AVAILABLE | ~~w~~ x y z | ~~w~~ ~~x~~ ~~y~~ z | w x y z |
| NUMBER OF FREQUENCIES AVAILABLE | ~~4~~ 3 | ~~4~~ 1 | 4 |
| DIFFICULTY FACTOR | $\frac{2-0.333}{4}$ | $\frac{1+1}{1}$ | $\frac{2-0.667}{4}$ |
| CELL SELECTED |  | X |  |
| FREQUENCY ASSIGNED TO SELECTED CELL |  | z |  |

FIG. 21

|  | CELL A | CELL B | CELL C |
|---|---|---|---|
| NUMBER OF FREQUENCIES NEEDED | 2 | ~~2~~ ~~1~~ 0 | 2 |
| FREQUENCIES ASSIGNED |  | w z |  |
| FREQUENCIES AVAILABLE | ~~w~~ x y ~~z~~ | ~~w~~ ~~x~~ ~~y~~ ~~z~~ | w x y z |
| NUMBER OF FREQUENCIES AVAILABLE | ~~4~~ ~~3~~ 2 | ~~4~~ ~~1~~ 0 | 4 |
| DIFFICULTY FACTOR | $\frac{2-0.333}{4}$ | $\frac{1+1}{1}$ | $\frac{2-0.667}{4}$ |
| CELL SELECTED |  | X |  |
| FREQUENCY ASSIGNED TO SELECTED CELL |  | z |  |

FIG. 22

| | CELL A | CELL B | CELL C |
|---|---|---|---|
| NUMBER OF FREQUENCIES NEEDED | ~~2 1~~ 0 | ~~2 1~~ 0 | ~~2 1~~ 0 |
| FREQUENCIES ASSIGNED | x c | w z | x c |
| FREQUENCIES AVAILABLE | ~~w x~~ z | ~~w x y z~~ | w ~~x y~~ z |
| NUMBER OF FREQUENCIES AVAILABLE | ~~4 3 2~~ 0 | ~~4 1~~ 0 | ~~4 3~~ 2 |

FIG. 23

TEST RESULTS

| METHOD | MAXIMUM NUMBER OF ASSIGNMENTS | % INCREASE OVER CONVENTIONAL GRAPH COLORING METHOD | AVERAGE C/I (dB) | STANDARD DEVIATION (dB) | WORST C/I (dB) |
|---|---|---|---|---|---|
| CONVENTIONAL GRAPH COLORING METHOD | 1356 | .......... | 20 | 12 | 18 |
| EMBODIMENT THAT ASSIGNS FREQUENCIES FROM SETS (USING STEP 52 ILLUSTRATED IN FIG. 5) | 1680 | 24 | 29 | 10 | 19 |
| EMBODIMENT THAT ASSIGNS FREQUENCY BY FREQUENCY | 1904 | 40 | 28 | 9 | 20 |

FIG. 24

METHODS AND APPARATUS FOR ASSIGNING FREQUENCIES IN A CELLULAR NETWORK

BACKGROUND OF THE INVENTION

1. Field of the Invention

The present invention relates to cellular telecommunications and, more particularly, to methods and apparatus for assigning frequencies in a cellular network.

2. Description of the Related Art

Cellular telephone providers supply cellular telephone service to callers within cellular telephone networks. Each network covers a geographic area that is divided into several smaller regions, generally referred to as cells. When a caller within a cell makes a cellular telephone call, the caller's cellular telephone establishes a connection with transmission/reception hardware within that cell. This hardware is generally referred to as a base station. The connection requires a pair of frequencies, one frequency to carry a first signal from the base station to the caller's telephone, and another frequency to carry a second signal from the caller's telephone to the base station.

A provider is typically allocated a pool of frequencies for use within a network. The provider controls the assignment of the frequencies of the pool to various cells in the network. To handle the demand for cellular telephone connections in a typical network, the provider must often reuse frequencies, i.e., assign the same frequency to more than one cell in the network.

Reuse of frequencies within a network may cause problems. In particular, use of a particular frequency in one cell may increase radio interference at that frequency in other cells. In some circumstances, a frequency becomes unusable in a cell because the combined interference from use of that frequency in other cells is too great. Usually when a caller attempts to use a frequency having excessive interference, the caller's connection fails. If frequencies are reused in cells that are too close together, a signal from one caller's connection in one cell may be overheard by another caller in another cell.

The problem of assigning frequencies within a cellular network, such that frequencies are reused and the above-described interference problems are avoided, is commonly referred to as the frequency assignment problem, and has been studied extensively. However, it appears that only a few approaches to the frequency assignment problem have been implemented in real cellular networks.

One such approach is a manual approach. In particular, sets of frequencies are assigned manually to cells. This approach is commonly used in practice.

Another approach is more automated and involves treating the frequency assignment problem as a graph coloring problem. In this approach, a nodal map of the network is developed, with each cell of the network plotted as a node. Frequencies are grouped into sets, with each set assigned a particular color. Then, each node on the map is assigned a color such that the number of colors is minimized, and such that no two adjacent nodes have the same color.

Attempts at implementing the graph coloring algorithm have been well documented. In particular, an article entitled "On Frequency Assignment in Mobile Automatic Telephone Systems," by Andreas Gamst and Werner Rave, IEEE (1982) B3.1.1, pp. 309–315, discusses several variations of the graph coloring method. Further variations of the graph coloring method are provided in an article entitled "Channel Assignment in Cellular Radio," by Kumar Sivarajan and Robert McEliece, IEEE (1989) Ch. 2379, pp. 846–850.

There are several drawbacks to the graph coloring method. First, the graph coloring method does not adequately represent real world situations, because it attempts to minimize the number of frequencies used in the network. Since cellular providers are typically allocated pools of frequencies, the number of frequencies is fixed, and there is no need to minimize the number of frequencies. Second, minimizing the number of frequencies may result in some frequencies of the pool being under-utilized and other frequencies being over-utilized. Over-utilization of frequencies typically produces unnecessarily high amounts of interference. Third, the graph coloring method does not take into account varying amounts of interference between cells. For example, the graph coloring method treats the interference for 10 frequencies the same as the interference for 50 frequencies.

Another approach to the frequency assignment problem is called applied frequency planning. In the applied frequency planning method, each cell has a "rest-capacity" that is a function of the maximum number of frequencies that can be assigned to the cell. The lower rest-capacity cells receive assignments before the higher rest-capacity cells. The applied frequency planning method is described in an article entitled "Applied Frequency Assignment," by J. Plehn, IEEE (1994) 0-7803-1927, pp. 853–857.

There are several drawbacks to the applied frequency planning method. First, the applied frequency planning method gives priority to the lower rest-capacity cells, assuming that it is harder to assign frequencies to those cells than to the higher rest-capacity cells. However, the higher rest-capacity cells may also have higher constraints with other cells, thus making it more difficult to assign frequencies to the higher rest-capacity cells than the lower rest-capacity cells. Another drawback is that the applied frequency planning method considers carrier-to-interference ratios only when two cells have the same rest-capacity. Accordingly, a cell could be considered a high rest-capacity cell although most of the available frequencies have inadequate carrier-to-interference ratios. Furthermore, the applied frequency planning method requires a significant amount of time to compute the rest-capacity for each cell prior to each assignment.

It is therefore desirable to provide methods and apparatus for assigning frequencies in a cellular network that avoid the drawbacks of the conventional approaches. It is also desirable to provide methods and apparatus for improving the number of assignments, average carrier-to-interference ratios, carrier-to-interference variability and worst-case carrier-to-interference ratios in a cellular network.

SUMMARY OF THE INVENTION

An embodiment of the present invention is directed to a method for assigning frequencies to a plurality of cells in a cellular network. The method includes a step of generating a difficulty factor for each cell, wherein each cell's difficulty factor is based on a number of available frequencies for that cell, and wherein the number of available frequencies for that cell is a variable number that can vary as frequencies are selected for cells in the cellular network. The method further includes the steps of selecting a cell from the plurality of cells based on each cell's difficulty factor; selecting a frequency for the selected cell from the available frequencies for that cell; and repeating the steps of generating a difficulty factor, selecting a cell and selecting a frequency, to assign the frequencies to the plurality of cells in the cellular network.

In another embodiment, each cell requires a predetermined number of frequencies to be selected for that cell. The step of generating a difficulty factor includes a step of determining each cell's difficulty factor based on the predetermined number of frequencies required to be selected for that cell, the number of available frequencies for that cell, and an adjustment factor for that cell, wherein each cell's adjustment factor is indicative of a relative level of difficulty in selecting the required predetermined number of frequencies for that cell during a previous assignment attempt.

In another embodiment, the method further includes a step of, following an unsuccessful attempt to assign frequencies to the plurality of cells, updating each cell's adjustment factor to represent the relative difficulty in selecting frequencies for that cell during the unsuccessful attempt, unselecting all of the selected cells and all of the selected frequencies for the selected cells, and re-performing the steps of generating a difficulty factor, selecting a cell, selecting a frequency, and repeating.

In another embodiment, the step of updating, unselecting and re-performing is performed only when at least one of the plurality of cells requires at least one more frequency and there are no frequencies available for use by that cell.

In another embodiment, the step of selecting the frequency for the selected cell includes the steps of determining a carrier-to-interference ratio for each of the selected cell's available frequencies; and choosing, from the selected cell's available frequencies, a frequency having the largest determined carrier-to-interference ratio, as the selected frequency for the selected cell.

In another embodiment, the step of determining the carrier-to-interference ratio includes the steps of providing, for each of the selected cell's available frequencies, a plurality of carrier-to-interference ratios between the selected cell and the other cells; and picking the minimum carrier-to-interference ratio of the plurality of carrier-to-interference ratios as the determined carrier-to-interference ratio.

In another embodiment, the method further includes a step of determining each cell's number of available frequencies based on a carrier-to-interference ratio, specific to that cell, for each frequency of a pool of frequencies.

Another embodiment of the invention is directed to a method for assigning frequencies to a plurality of cells in a cellular network, wherein each cell requires a predetermined number of frequencies to be selected for that cell. The method includes a step of generating a difficulty factor for each cell, wherein each cell's difficulty factor is based on an adjustment factor for that cell, and wherein, following a first assignment attempt, each cell's adjustment factor is indicative of a relative level of difficulty in selecting the required predetermined number of frequencies for that cell during the first assignment attempt. The method further includes the steps of selecting a cell from the plurality of cells based on each cell's difficulty factor; selecting a frequency from the available frequencies for the selected cell; when at least one of the plurality of cells requires at least one more frequency and there is at least one frequency available for use by that cell, repeating the steps of generating a difficulty factor, selecting a cell and selecting a frequency;

and when at least one of the plurality of cells requires at least one more frequency and there are no frequencies available for use by that cell, updating each cell's adjustment factor to represent the relative difficulty in selecting frequencies for that cell during a second assignment attempt, unselecting all of the selected cells and all of the selected frequencies for the selected cells, and re-performing the steps of generating a difficulty factor, selecting a cell, selecting a frequency, as the second assignment attempt.

In another embodiment, the step of generating a difficulty factor includes a step of determining each cell's difficulty factor based on the predetermined number of frequencies required to be selected for that cell, the adjustment factor for that cell, and a number of available frequencies for that cell, wherein the number of available frequencies for that cell is a variable number that can vary as frequencies are selected for cells in the cellular network.

In another embodiment, the method further includes a step of determining each cell's number of available frequencies based on a carrier-to-interference ratio, specific to that cell, for each frequency of a pool of frequencies.

In another embodiment, the step of selecting the frequency for the selected cell includes the steps of determining a carrier-to-interference ratio for each of the selected cell's available frequencies; and choosing, from the selected cell's available frequencies, a frequency having the largest determined carrier-to-interference ratio, as the selected frequency for the selected cell.

In another embodiment, the step of determining the carrier-to-interference ratio includes the steps of providing, for each of the selected cell's available frequencies, a plurality of carrier-to-interference ratios between the selected cell and the other cells; and picking the minimum carrier-to-interference ratio of the plurality of carrier-to-interference ratios as the determined carrier-to-interference ratio.

Another embodiment of the invention is directed to a computerized apparatus for assigning frequencies to a plurality of cells in a cellular network. The computerized apparatus includes an input/output device; memory, coupled to the input/output device, wherein the memory stores, at least temporarily, a computer program; and a processor, coupled to the input/output device and the memory, wherein the processor executes the computer program in response to a command from the input/output device. The computer program includes means for generating a difficulty factor for each cell, wherein each cell's difficulty factor is based on a number of available frequencies for that cell, and wherein the number of available frequencies for that cell is a variable number that can vary as frequencies are selected for cells in the cellular network; means for selecting a first cell from the plurality of cells based on each cell's difficulty factor, and a frequency for the selected first cell from the available frequencies for the selected first cell; and means for selecting a new cell from the plurality of cells based on each cell's difficulty factor, and a frequency for the selected new cell, wherein the new cell is one of the first cell and a second cell.

In another embodiment, each cell requires a predetermined number of frequencies to be selected for that cell. The means for generating a difficulty factor includes means for determining each cell's difficulty factor based on the predetermined number of frequencies required to be selected for that cell, the number of available frequencies for that cell, and an adjustment factor for that cell, wherein each cell's adjustment factor is indicative of a relative level of difficulty in selecting the required predetermined number of frequencies for that cell during a previous assignment attempt.

In another embodiment, the computer program further includes means, responsive to an unsuccessful attempt to assign frequencies to the plurality of cells, for updating each cell's adjustment factor to represent the relative difficulty in selecting frequencies for that cell during the unsuccessful attempt, and unselecting all of the selected cells and all of the selected frequencies for the selected cells, so that the computer program can perform a new attempt to assign frequencies to the plurality of cells.

In another embodiment, the means for selecting the frequency for the selected cell includes means for determining a carrier-to-interference ratio for each of the selected cell's available frequencies; and means for choosing, from the selected cell's available frequencies, a frequency having the largest determined carrier-to-interference ratio, as the selected frequency for the selected cell.

In another embodiment, the means for determining the carrier-to-interference ratio includes means for providing, for each of the selected cell's available frequencies, a plurality of carrier-to-interference ratios between the selected cell and the other cells; and means for picking the minimum carrier-to-interference ratio of the plurality of carrier-to-interference ratios as the determined carrier-to-interference ratio.

In another embodiment, the computer program further includes means for determining each cell's number of available frequencies based on a carrier-to-interference ratio, specific to that cell, for each frequency of a pool of frequencies.

BRIEF DESCRIPTION OF THE DRAWINGS

A better understanding of the present invention can be obtained when the following detailed description of the invention is considered in conjunction with the following drawings in which:

FIG. 7 is a chart illustrating various characteristics of the three cell network of FIG. 6, and various values of variables for a first iteration;

FIG. 8 is a chart illustrating various characteristics of the three cell network of FIG. 6, and various values of variables during a first frequency assignment of the first iteration;

FIG. 9 is a chart illustrating various characteristics of the three cell network of FIG. 6, and various values of variables after the first frequency assignment illustrated in FIG. 8;

FIG. 10 is a chart illustrating various characteristics of the three cell network of FIG. 6, and various values of variables during a second frequency assignment of the first iteration;

FIG. 11 is a chart illustrating various characteristics of the three cell network of FIG. 6, and various values of variables after the second frequency assignment illustrated in FIG. 10;

FIG. 12 is a chart illustrating various characteristics of the three cell network of FIG. 6, and various values of variables during a third frequency assignment of the first iteration;

FIG. 13 is a chart illustrating various characteristics of the three cell network of FIG. 6. and various values of variables after the third frequency assignment illustrated in FIG. 12;

FIG. 14 is a chart illustrating various characteristics of the three cell network of FIG. 6, and various values of variables during a fourth frequency assignment of the first iteration;

FIG. 15 is a chart illustrating various characteristics of the three cell network of FIG. 6, and various values of variables after the fourth frequency assignment illustrated in FIG. 14;

FIG. 16 is a chart illustrating various characteristics of the three cell network of FIG. 6, and various values of variables during a fifth frequency assignment of the first iteration;

FIG. 17 is a chart illustrating various characteristics of the three cell network of FIG. 6, and various values of variables after the fifth frequency assignment illustrated in FIG. 16;

FIG. 18 is a chart illustrating various characteristics of the three cell network of FIG. 6, and various values of variables for a second iteration;

FIG. 19 is a chart illustrating various characteristics of the three cell network of FIG. 6, and various values of variables during a first frequency assignment of the second iteration;

FIG. 20 is a chart illustrating various characteristics of the three cell network of FIG. 6, and various values of variables after the first frequency assignment illustrated in FIG. 19;

FIG. 21 is a chart illustrating various characteristics of the three cell network of FIG. 6, and various values of variables during a second frequency assignment of the second iteration;

FIG. 22 is a chart illustrating various characteristics of the three cell network of FIG. 6, and various values of variables after the second frequency assignment illustrated in FIG. 21;

FIG. 23 is a chart illustrating frequency assignments generated for the example of FIG. 6 in accordance with the invention; and FIG. 24 is a chart illustrating frequency assignment results, for a midsized urban area, generated by the prior art graph coloring method, and by methods according to embodiments of the invention.

DETAILED DESCRIPTION

Figure 1:
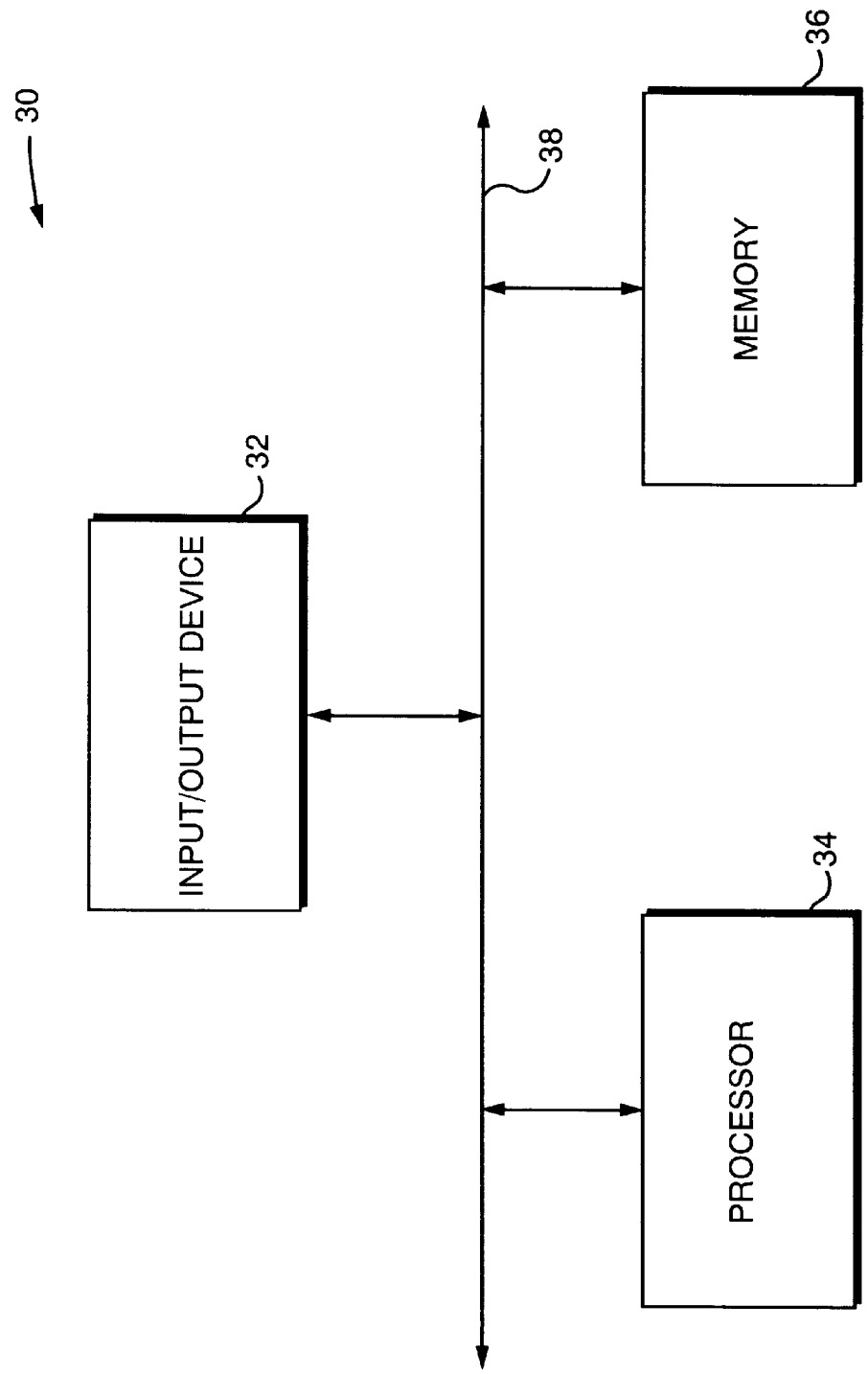
FIG. 1 is a block diagram illustrating a general purpose computer suitable for practicing the invention.

The present invention provides methods and apparatus for assigning frequencies in a cellular telephone network. The invention may be practiced using a programmed computer such as the general purpose computer 30 illustrated in FIG. 1. The computer 30 includes an input/output device 32, a processor 34 and memory 36 that are connected through a bus 38. In response to commands, in the form of computer signals, from the input/output device 32, the processor 34 executes one or more programs stored, at least temporarily, in the memory 36 to generate frequency assignments for a cellular telephone network.

Other hardware configurations are suitable for the general purpose computer 30 shown in FIG. 1, and are intended to be within the scope of the invention. For example, the input/output device 32 may include separate devices such as a mouse, a keyboard, a display terminal, a printer, a network interface, and/or any other device that performs input or output. The processor 34 may include a single processing device (e.g., a microprocessor), or multiple processing devices. The memory 36 may include primary memory such as semiconductor memory, secondary memory such as magnetic disk and/or tape, CD memory, and/or any other conventional computer storage device.

The above-described programmed computer may perform the methods of the invention for assigning frequencies in a cellular telephone network. According to another embodiment of the invention, a programmed distributed processing system may perform the methods of assigning frequencies. According to yet another embodiment of the invention, an apparatus may be specially constructed to perform the methods of assigning frequencies. For simplicity, various embodiments of the method will be described with reference to the programmed general purpose computer 30 shown in FIG. 1. However, it should be understood that the methods of the invention may be performed by any of the above-described apparatus, including but not limited to the programmed distributed processing system, the specially constructed apparatus, or any other machine that is configured to perform the methods.

The programmed computer performs a method of assigning frequencies to cells in a cellular telephone network when the processor 34 executes the one or more programs stored in the memory 36. In particular, the processor 34 generates a difficulty factor for each cell of the network, selects a cell based on each cell's difficulty factor, and selects a frequency for the selected cell. By repeating these steps, the processor 34 produces frequency assignments that are used to operate the network. In particular, the frequency assignments define the carrier frequencies used to communicate between the base station and each of the cellular telephones in each cell of the network. The number of frequencies assigned to a cell depends, at least in part, on the expected volume of calls in the cell.

Figure 2:
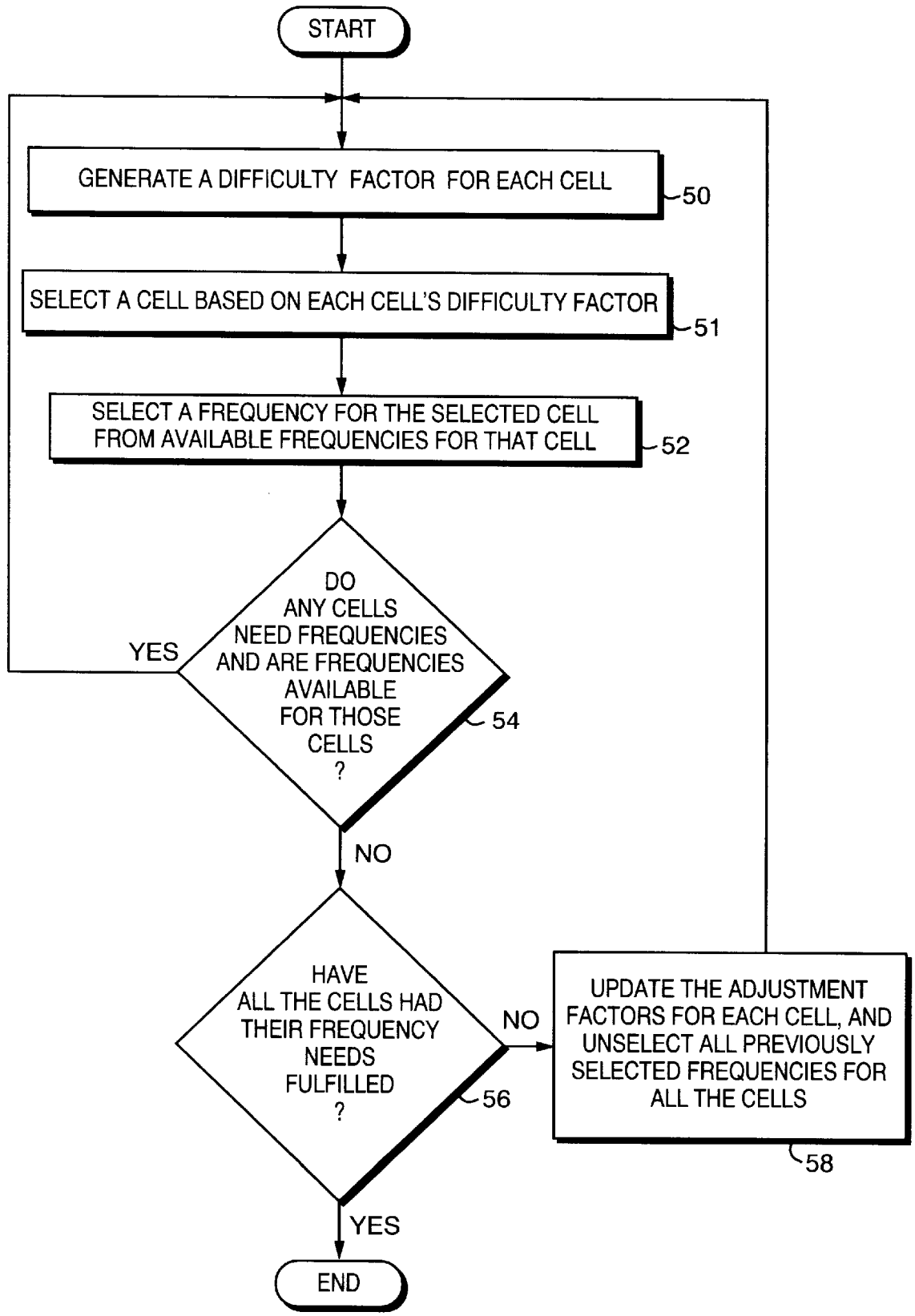
FIG. 2 is a flow diagram illustrating a frequency assignment method, according to an embodiment of the invention.

FIG. 2 is a flow diagram illustrating a method for assigning frequencies in a cellular telephone network according to an embodiment of the invention. In step 50, the computer generates a difficulty factor for each cell in the network. In step 51, the computer selects a cell based on each cell's difficulty factor. In step 52, the computer selects a frequency for the selected cell from frequencies that are available to the selected cell. In step 54, the computer determines whether there are any cells of the network that need frequencies, and whether there are frequencies available for those cells. If the answer is "yes" to both questions, the computer loops back and repeats steps 50, 51 and 52. If the answer is "no" to either question, the computer proceeds to step 56. In step 56, the computer determines whether all the cells have had their frequency needs fulfilled. If the answer is "yes", the computer is finished assigning frequencies. If the answer is "no", the computer proceeds to step 58. In step 58, the computer updates the adjustment factor for each cell, unselects all previously selected frequencies for all the cells, and loops back to repeat the frequency selection process.

Each loop through steps 50–54 is called as a "pass". Each loop through steps 50–56 is called an "iteration". The programmed computer may be able to complete the assignment of frequencies in one iteration, i.e., without ever looping back to step 50 from step 56. Such a situation may occur when the pool of available frequencies is large relative to the number of frequencies required by the cells of the network. However, the programmed computer may need to perform several iterations before it is able to fulfill the frequency needs of each cell and complete the assignment of frequencies in the network.

According to an embodiment of the invention, the computer, in step 50, generates each cell's difficulty factor based on an adjustment factor for that cell. During a first iteration through steps 50–56, the adjustment factors for each cell are set equal to 0. In step 58, the adjustment factor of each cell is updated based on whether the cell was deemed to be an "easy" cell (i.e., the computer fulfilled the cell's frequency requirements during the iteration), or a "hard" cell (i.e., the computer did not fulfill the cell's frequency requirements during the iteration). In step 58, for each "hard" cell, the computer sets the cell's adjustment factor according to equation (1).

$$\text{adjustment factor} = \text{Number of unfilled frequencies for the "hard" cell} \quad \text{Eq. (1).}$$

In step 58, for each "easy" cell, the computer sets the cell's adjustment factor according to equation (2).

$$\text{adjustment factor} = (-1) * \frac{U}{A} * L, \quad \text{Eq. (2).}$$

wherein
U=sum of all unfilled needs over all cells,
A=sum of all the available frequencies over all cells after the last assignment, and
L=number of available frequencies for the "easy" cell after the last assignment for the "easy" cell.

The fraction (U/A) forces the sum of all adjustment factors to be zero so that there is no net increase or decrease in overall adjusted difficulty. As a result, the "easy" cells are made "easier" by the same amount that the "hard" cells are made "harder".

In another embodiment, the programmed computer uses a global scaling factor S to calculate the adjustment factors. In particular, in step 58, the programmed computer sets the adjustment factors, for each "hard" cell, according to Equation (3).

$$\text{adjustment factor} = (S)*(\text{Number of unfilled frequencies}) \quad \text{Eq. (3).}$$

wherein S=a global scaling factor.
In step 58, for each "easy" cell, the computer sets the cell's adjustment factor according to equation (4).

$$\text{adjustment factor} = (-S) * \frac{U}{A} * L, \quad \text{Eq. (4).}$$

wherein
S=the global scaling factor,
U=sum of all unfilled needs over all cells,
A=sum of all the available frequencies over all cells, and
L=number of available frequencies for the "easy" cell after the last assignment for the "easy" cell.

During the first iteration, the global scaling factor is set equal to 1. If it is determined that updating the adjustment factors does not lead to completion of the frequency assignment (e.g., the value U diverges over several iterations rather than converges), the programmed computer increments the global scaling factor S (e.g., by 1) before it next updates the adjustment factors. Then, the assignment process is repeated using the adjustment factors that provided the lowest number of unassigned frequencies up to this point. This increases the effect of the adjustment factors, and reduces the possibility of the programmed computer being unable to fulfill the frequency requirements of each cell in the network.

Figure 3:
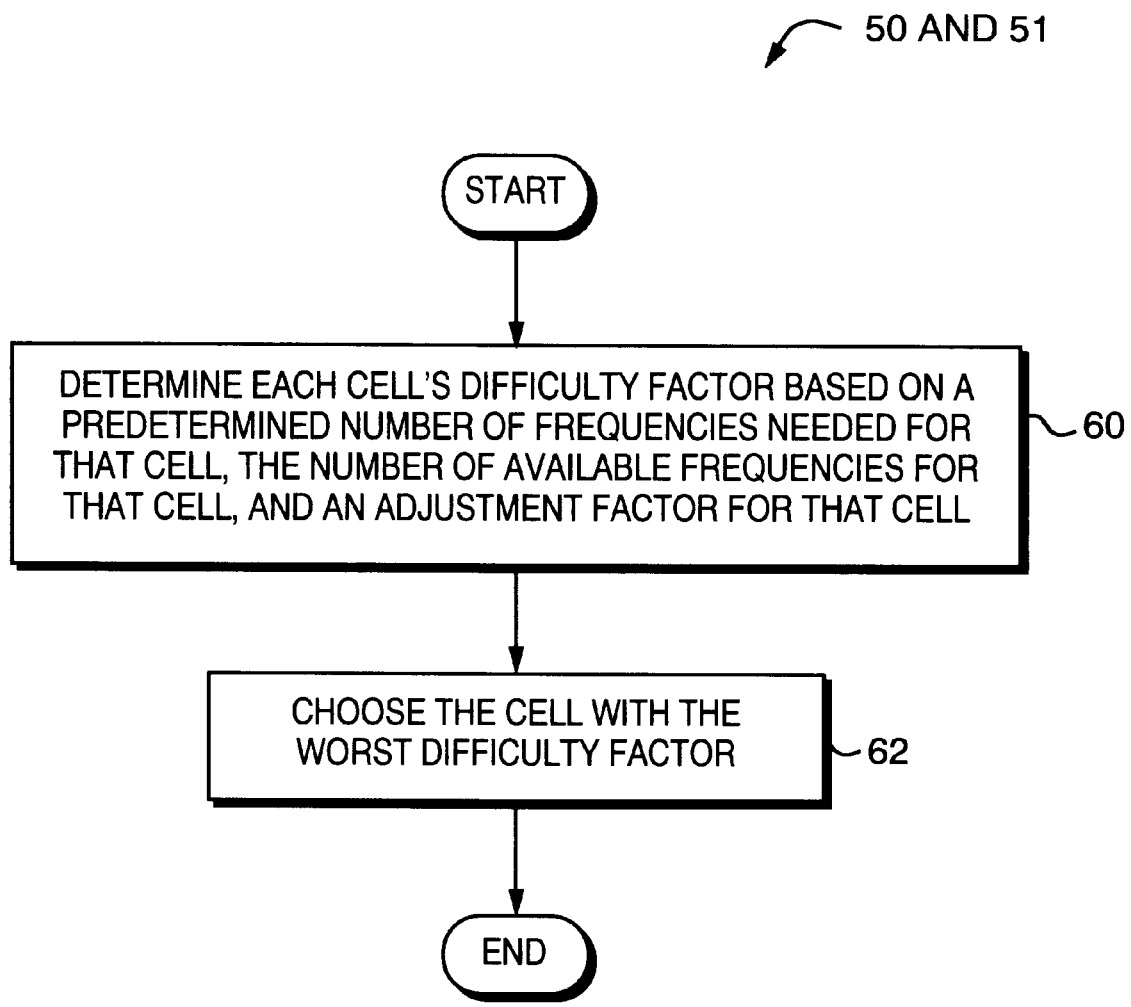
FIG. 3 is a flow diagram illustrating a procedure for selecting a cell based on difficulty factors calculated for each cell in a network, according to an embodiment of the invention.

FIG. 3 is a flow diagram illustrating further details of steps 50 and 51 according to an embodiment of the invention. In step 60, the computer generates difficulty factors for cells in the network. In particular, the computer determines a difficulty factor for each cell based on a predetermined number of frequencies needed for the cell, a number of frequencies available to the cell, and an adjustment factor for the cell. The difficulty factor for the cell indicates how difficult it is to assign a frequency to that cell. In one embodiment, the difficulty factor for each cell is calculated according to equation (5).

$$\text{Difficulty factor} = \frac{\text{Number of frequencies needed} + \text{Adjustment factor}}{\text{Number of available frequencies}} \quad \text{Eq. (5)}.$$

The number of frequencies needed by the cell is the number of frequencies that the cell needs to satisfy the connection demand of the cell. The number of available frequencies for the cell is the number of frequencies available for use by the cell from the pool of available frequencies and not previously assigned.

The computer determines the number of available frequencies for the cell based on a minimum separation requirement and a carrier-to-interference ratio requirement for the cell. The minimum separation requirement is defined as the minimum difference between frequencies used in the same cell. For example, if Cell X has a minimum separation requirement of 2, once Cell X is assigned a first frequency, Cell X cannot be assigned another frequency within 2 frequencies of the first frequency.

A carrier-to-interference ratio (C/I) for a particular frequency is defined as the ratio of carrier signal strength (from the base station or cellular telephone) at that particular frequency to interference at that particular frequency. The interference is the sum of unwanted signal power from sources other than the source of the carrier signal. The C/I requirement for a cell is defined as a C/I threshold for that cell. That is, for a frequency to be deemed available for use in that cell, the C/I at that frequency must exceed the C/I threshold. If the C/I for that frequency does not exceed the C/I threshold, that frequency is deemed unavailable for use in that cell.

The number of frequencies needed and the number of available frequencies change as frequencies are assigned in the network. The adjustment factor for each cell is initially set equal to 0. However, the adjustment factors for the cells may be changed to values other than 0 in step 58, as shown in FIG. 2.

Before describing step 62 which follows step 60, a distinction should be noted between the above-described method and the applied frequency planning method. According to the present invention, a difficulty factor for each cell is calculated, based on the number of frequencies available for use by the cell. This number of available frequencies is different from the maximum number of frequencies that can be assigned to the cell, as used by the applied frequency planning method to determine a cell's "rest-capacity". In particular, the number of available frequencies for each cell is a variable number that changes as frequencies are assigned to cells within the network. The number depends primarily on the constraints between the cells. For example, the assignment of a frequency to a Cell X may cause one or more frequencies to become unavailable in a Cell Y. In contrast, the maximum number of frequencies that can be assigned to a cell depends primarily on the constraints on the assignment of frequencies to the same cell.

In step 62, the computer selects a cell based on the difficulty factors determined in step 60, i.e., the computer chooses the cell with the worst difficulty factor. In particular, the computer cycles through a list of the cells, starting at the last selected cell, to find the cell having the worst difficulty factor. In the embodiment wherein the difficulty factor is generated according to Equation (5), the worst difficulty factor is the difficulty factor having the highest value. If two or more cells are tied (e.g., two or more cells have the highest value), the computer chooses the cell that would have been next in the list as it cycled through the list. Alternatively, if two or more cells are tied, the computer can choose the cell having the worst difficulty factor that was previously closest to the top of the list.

Figure 4:
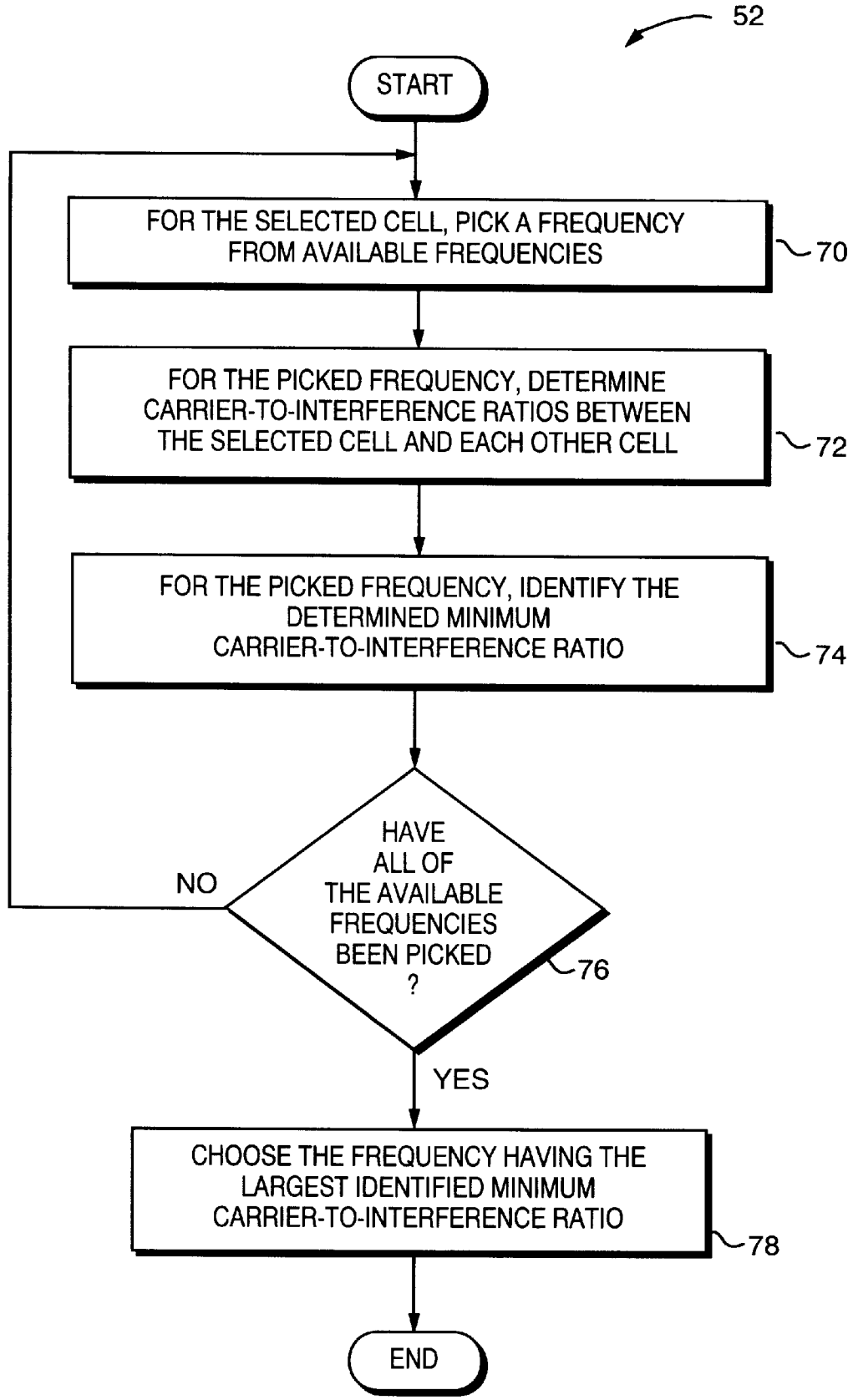
FIG. 4 is a flow diagram illustrating a procedure for selecting a frequency for a selected cell on a frequency-by-frequency basis, according to an embodiment of the invention.

FIG. 4 is a flow diagram illustrating further details of step 52 shown in FIG. 2 according to an embodiment of the invention. In step 70, the computer picks a frequency from the frequencies that are available for use by the cell selected in step 51. In step 72, for the frequency picked in step 70, the computer determines a carrier-to-interference ratio between the selected cell and each of the other cells in the network, i.e., $(C/I)_j$ over all j cells of the network. In step 74, the computer identifies the minimum $(C/I)_j$, i.e., $(C/I)_{j\ min}$, representing the worst carrier-to-interference relationship between the selected cell and a particular source, i.e., cell j. In step 76, the computer determines whether all of the available frequencies have been picked. If the answer is "no", the computer loops back and repeats steps 70–74. If the answer is "yes", the computer proceeds to step 78. At this point, the computer has identified a $(C/I)_{j\ min}$, i.e., a worst carrier-to-interference relationship between the selected cell and a particular source, for each available frequency. In step 78, the computer chooses the available frequency having the largest $(C/I)_{j\ min}$, i.e., the available frequency that is the least likely to be affected by interference from a particular source, as the selected frequency for the cell selected in step 51.

If there is a tie between two or more frequencies, the computer is consistent in choosing one of the frequencies as the selected frequency. In one embodiment, if there is a tie between two or more frequencies (i.e., two or more frequencies have the largest $(C/I)_{j\ min}$), the computer selects the lowest of the tied frequencies. In another embodiment, the computer selects the highest of the tied frequencies.

Figure 5:
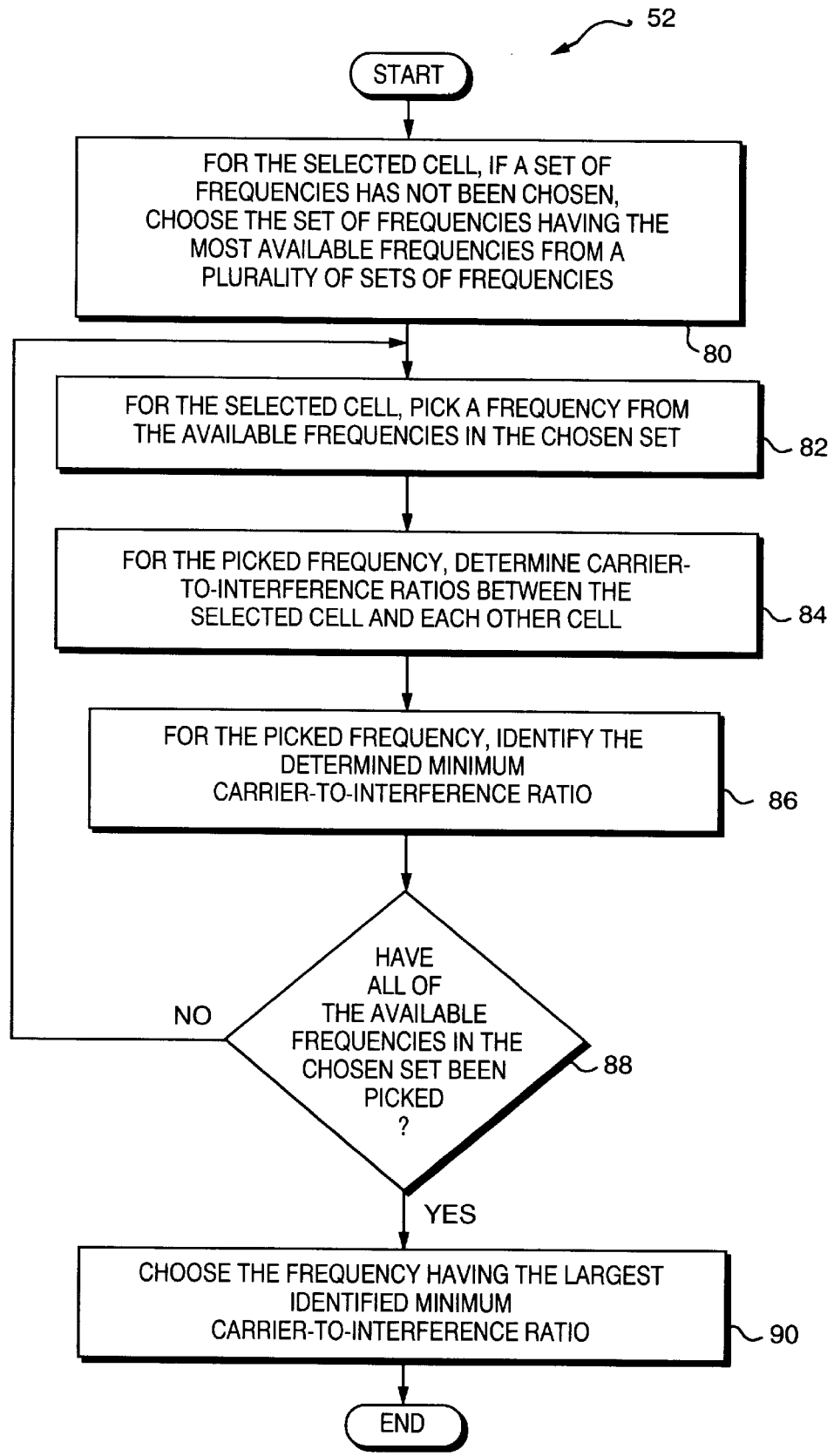
FIG. 5 is a flow diagram illustrating a procedure for selecting a frequency for a selected cell from a frequency set, according to an embodiment of the invention.

FIG. 5 is a flow diagram illustrating further details of step 52 (see FIG. 2) according to another embodiment of the invention. In this embodiment, prior to assigning frequencies, a pool of available frequencies is divided into a plurality of sets of frequencies. In step 80, if a set of frequencies has not been chosen for the cell selected in step 51, the computer chooses the set of frequencies having the most available frequencies from the plurality of sets of frequencies. In step 82, the computer picks a frequency available to the cell from the set chosen in step 80. In step 84, the computer determines, for the frequency picked in step 82, carrier-to-interference ratios between the selected cell and each of the other cells in the network. In step 86, the computer identifies, for the frequency picked in step 84, the $(C/I)_{j\ min}$. In step 88, the computer determines whether all of the available frequencies, in the set chosen in step 80, have been picked. If the answer is "no", the computer loops back and repeats steps 82–88. If the answer is "yes", the computer proceeds to step 90. In step 90, the computer chooses, as the selected frequency for the cell selected in step 51, the frequency having the largest identified minimum carrier-to-interference ratio. The computer repeats steps 80–90, as illustrated in FIG. 5, until the cell selected in step 51 has all of its frequency requirements fulfilled.

An example is now provided to further illustrate the methods and apparatus of the invention. This example uses a global scale factor, and step 52, as illustrated in FIG. 4.

Figure 6:
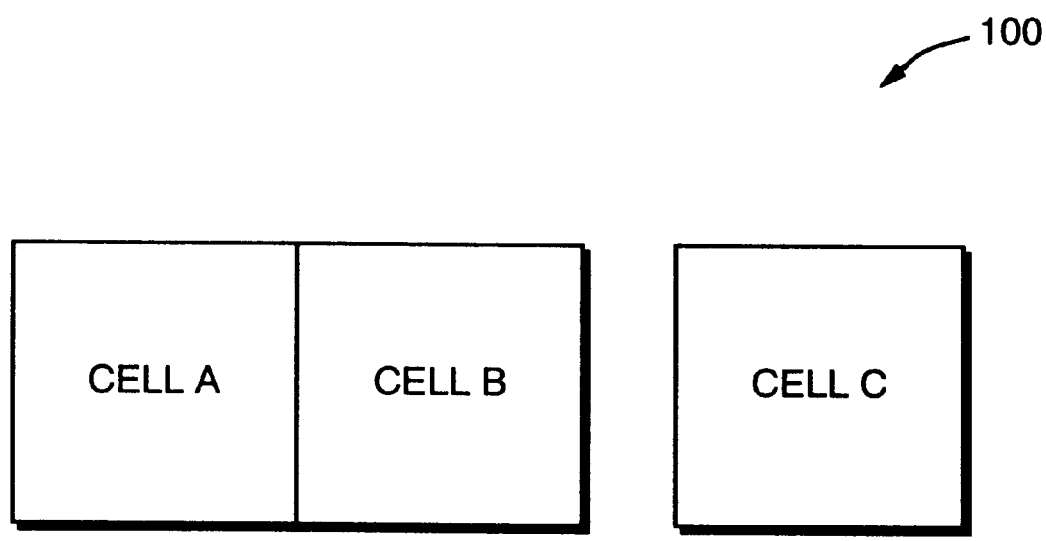
FIG. 6 is a schematic representation of an example of a three cell network.

In this example, a network 100 shown in FIG. 6 includes three cells: Cell A, Cell B and Cell C. Cell A and Cell B share a physical boundary, and Cell C is physically isolated from both Cell A and Cell B. Cell A and Cell B have a separation requirement, which is defined as the minimum allowable difference between frequencies of two different cells, equal to 1, and Cell C has a separation requirement of 0 with respect to each of Cell A and Cell B. Additionally, as illustrated in FIG. 7, each of Cell A and Cell C is to have a minimum separation requirement of 1, and Cell B is to have a minimum separation requirement of 3. There is a pool of four frequencies (w, x, y and z) available to the network 100, and connection demand is such that each cell requires 2 frequency assignments. As further illustrated in FIG. 7, each cell has an initial adjustment factor equal to 0, and the global scale factor S is initialized to 1.

To simplify this example, it is assumed that assignment of a frequency does not cause another cell's C/I for that frequency to fall below the minimum C/I threshold causing the frequency to become unavailable to that cell. However, according to an embodiment of the invention, the computer determines whether the assignment of a frequency causes another cell's C/I for that frequency to fall below the minimum C/I threshold, and adjusts the number of available frequencies for that cell accordingly.

When the processor 34 executes one or more frequency assignment programs stored in the memory 36, the computer performs steps 50 and 51, as illustrated in FIG. 2. That is, the computer generates a difficulty factor for each cell, and selects a cell of the network 100 based on the each cell's difficulty factor. As shown in FIG. 3, step 50 includes step 60, which determines a difficulty factor for each cell based on the number of frequencies needed for the cell, an adjustment factor for the cell, and the number of frequencies available to the cell. The difficulty factors for each cell of the network 100 are calculated using Equation (5), and are shown in FIG. 8. In step 51, which includes step 62, the computer selects the cell with the worst difficulty factor (i.e., the highest value). The computer finds the cell with the worst difficulty factor by cycling through the cells in the order of Cell A, Cell B and Cell C. Since there is a three-way tie, the computer selects Cell A, the cell encountered first by the computer as it cycles through the order.

The computer then proceeds to step 52 and selects a frequency for Cell A based on carrier-to-interference information. Since there are no frequencies assigned to any of the cells, there are no carrier-to-interference restrictions. Hence, any of frequencies w, x, y and z is suitable. As illustrated in FIG. 8, the computer selects frequency w, since frequency w is the lowest available frequency.

At this point, frequency w is deemed to have been assigned to Cell A. Accordingly, as illustrated in FIG. 9, Cell A now needs only 1 more frequency, and frequency w is not available for further assignment to Cell A since the minimum separation requirement of Cell A is 1. Accordingly, the number of frequencies available to Cell A is 3 since frequencies x, y and z, are still available to Cell A. Frequency w is not available for further assignment to Cell B, and the number of frequencies available to Cell B is 3, since the separation requirement between Cell A and Cell B is 1. Since it is assumed that a frequency assignment does not cause another cell's C/I for that frequency to fall below the minimum C/I threshold causing the frequency to become unavailable to that cell, the assignment of frequency w to Cell A does not affect the number of available frequencies in Cell C.

The computer then proceeds to step 54 and determines whether there are any cells of the network that need frequencies, and whether there are frequencies available for those cells. The answer is "yes" to both questions since, for example, Cell A needs 1 more frequency and there are 3 frequencies available to Cell A. Accordingly, the computer loops back to step 50 for a second "pass".

As illustrated in FIG. 2, the computer performs steps 50 and 51. In particular, the computer performs step 60 in FIG. 3 by calculating new difficulty factors for each cell, as illustrated in FIG. 10. In step 62, the computer selects the cell with the worst difficulty factor. Accordingly, as illustrated in FIG. 10, Cell B is selected, since its difficulty factor has the highest value.

In step 52, the computer selects a frequency for Cell B based on carrier-to-interference information. In particular, for steps 70 and 72, the computer picks each available frequency, determines carrier-to-interference ratios between Cell B and each other cell. As illustrated in FIG. 10, each of frequencies x, y and z has a minimum C/I of 1.0. Since there is a three-way tie for the largest minimum C/I, the computer chooses the lowest of the frequencies in the tie, i.e., frequency x for Cell B, as illustrated in FIG. 10. Hence, frequency x has now been assigned to Cell B. It should be understood that the computer did not need to determine the carrier-to-interference ratio for frequency w since frequency w is unavailable for assignment to Cell B.

FIG. 11 illustrates the updated characteristics of the network 100. In particular, frequency x is no longer available to Cell A due to the separation requirement between Cell A and Cell B being equal to 1. Cell B now needs only 1 frequency. However, frequencies w, x, y and z are no longer available to Cell B since the minimum separation requirement of Cell B is 3. Accordingly, Cell B's frequency need cannot be fulfilled because there are no available frequencies left for use in Cell B. Nevertheless, rather than stop the first iteration, the computer continues the first iteration because the results of the first iteration will be used in the second iteration. In step 54, the computer determines that there is a cell (e.g., Cell A) in the network that needs a frequency and that the cell has at least one available frequency. Accordingly, step 54 proceeds to step 50, for a third "pass".

As illustrated in FIG. 3, the computer performs steps 60 and 62 of steps 50 and 51 illustrated in FIG. 2. In particular, as illustrated in FIG. 12, the computer generates new difficulty factors for each cell that can receive a frequency assignment, and selects the cell with the worst difficulty factor. There is a tie between the difficulty factors of Cell A and Cell C. Accordingly, the computer selects Cell C since Cell C is the next cell encountered as the computer cycles through the cells beginning with the last selected cell, Cell B. It should be understood that the computer does not need to generate a difficulty factor for Cell B since there are no available frequencies for Cell B.

In step 52, the computer selects a frequency for Cell C based on carrier-to-interference information. In particular, for steps 70 and 72, the computer picks each available frequency, and determines carrier-to-interference ratios C/I's between Cell C and each other cell in the network. Between cells C and A, $(C/I)_w$, $(C/I)_x$, $(C/I)_y$, and $(C/I)_z$ are respectively 0.9, 1.0, 1.0, and 1.0. Between cells C and B, $(C/I)_w$, $(C/I)_x$, $(C/I)_y$, and $(C/I)_z$ are respectively 1.0, 0.8, 1.0 and 1.0. As illustrated in FIG. 12, the minimum C/I for frequency w, i.e, $(C/I)_{w\ min}$, is 0.9, due to interference that would be caused from usage of frequency w in Cell A. Similarly, $(C/I)_{x\ min}$ for frequency x is 0.8, due to interference that would be caused from usage of frequency x in Cell B. However, the minimum C/I for frequencies y and z is 1.0.

Hence, frequencies y and z are the available frequencies that are the least likely to be affected by interference from a particular source. Since there is a tie for the largest minimum C/I, the computer chooses the lowest available frequency, i.e., frequency y for Cell C, as shown in FIG. 12. Hence, frequency y has now been assigned to Cell C.

In step 54, it is determined that there is still at least one cell in the network that needs a frequency and that the cell has at least one available frequency. In particular, as illustrated in FIG. 13, the number of frequencies needed by Cell C is 1, the frequencies available to Cell C are frequencies w, x and z, and the number of frequencies available to Cell C is 3. Accordingly, step 54 proceeds to step 50, again.

As illustrated in FIG. 3, the computer performs steps 60 and 62 of steps 50 and 51 illustrated in FIG. 2. In particular, the computer calculates new difficulty factors for each cell, as illustrated in FIG. 14, and selects the cell with the worst difficulty factor. Accordingly, as illustrated in FIG. 14, the computer selects Cell A.

In step 52, the computer selects a frequency for Cell A based on carrier-to-interference information. In particular, for steps 70 and 72, the computer picks each available frequency, and determines carrier-to-interference ratios between Cell A and each other cell. As illustrated in FIG. 14, $(C/I)_{y\ min}$ for frequency y is 0.9, due to interference that would be caused from usage of frequency y in Cell C, and $(C/I)_{z\ min}$ for frequency z is 1.0. The computer selects frequency z for Cell A because frequency z has the largest minimum C/I, as shown in FIG. 12. Hence, frequency z has now been assigned to Cell A.

In step 54, it is determined that there is a cell in the network that needs a frequency and that the cell has at least one available frequency. In particular, as illustrated in FIG. 15, although the number of frequencies needed by Cell A is 0 and there are no frequencies available for Cell B, the number of needed frequencies for Cell C is 1 and there are 3 frequencies available to Cell C. Accordingly, step 54 proceeds to step 50, again.

As illustrated in FIG. 3, the computer performs steps 60 and 62 of steps 50 and 51 illustrated in FIG. 2. In particular, the computer calculates new difficulty factors for each cell, as illustrated in FIG. 16, and selects the cell with the worst difficulty factor. Here, Cell C is the only cell left and the computer selects Cell C.

In step 52, the computer selects a frequency for Cell C based on carrier-to-interference information. In particular, for steps 70 and 72, the computer picks each available frequency, and determines carrier-to-interference ratios between Cell C and each other cell. As illustrated in FIG. 16, $(C/I)_{w\ min}$ for frequency w is 0.9, $(C/I)_{x\ min}$ for frequency x is 0.8, and $(C/I)_{z\ min}$ for frequency z is 0.9. Accordingly, there is a tie between the largest minimum C/I of frequency w and frequency z. As illustrated in FIG. 16, the computer chooses frequency w since it is the lowest of the two frequencies. Hence, frequency w has now been assigned to Cell C.

In step 54, it is determined that there is no cell in the network that needs a frequency and has at least one available frequency. In particular, as illustrated in FIG. 17, there are no frequencies needed for Cell A or Cell C. Additionally, Cell B needs one frequency but there are no available frequencies for Cell B. Hence, step 54 proceeds to step 56.

In step 56, the computer determines whether all the cells have had their frequency needs fulfilled. Cell B has not had its frequency needs fulfilled because it still needs 1 frequency but there are none available. Accordingly, step 56 proceeds to step 58.

In step 58, the computer updates the adjustment factor for each cell in the network. Cell A and Cell C are considered "easy" cells since the computer was able to fulfill their frequency requirements during the last iteration. Accordingly, the computer updates the adjustment factors for Cell A and Cell C according to Equation (4). In particular, for each calculation using Equation (4), U equals 1 since there was 1 unfilled need over all the cells in network 100 (i.e., Cell B still needed 1 frequency), and A equals 3 since there were 3 available frequencies over all the cells in the network 100 (i.e., frequency y was still available in Cell A, and frequency x and frequency z were still available in Cell C). For Cell A, L equals 1 since there was 1 frequency still available for Cell A, and the updated adjustment factor for Cell A is −0.333. For Cell C, L equals 2 since there were 2 frequencies still available for Cell C, and the updated adjustment factor for Cell C is −0.667.

Cell B is considered a "hard" cell since the computer did not fulfill Cell B's frequency requirements during the first iteration. Accordingly, the computer updates the adjustment factor for Cell B according to Equation (3). In particular, Cell B's updated adjustment factor equals 1 since the global scaling factor S equals 1 and the number of unfilled frequencies for Cell B equals 1.

It should be understood that the sum of adjustment factors is 0. Hence, there is no net increase or decrease in overall adjusted difficulty.

In step 58, the computer unselects all previously selected frequencies for all the cells. Accordingly, as illustrated in FIG. 18, the frequencies w, x, y and z are no longer assigned. Then, step 58 proceeds to step 50 (see FIG. 2) so that a second iteration can begin.

As illustrated in FIG. 3, the computer performs steps 60 and 62 of steps 50 and 51 illustrated in FIG. 2. In particular, the computer calculates difficulty factors for each cell, as illustrated in FIG. 19, and selects the cell with the worst difficulty factor. Accordingly, as illustrated in FIG. 19, the computer selects Cell B as its first choice. It should be understood that the Cell A was selected as its first choice in the first iteration, and that the updated adjustment factors have caused Cell B now to have a worse difficulty factor than Cell A leading to the computer's choice of Cell B as the first choice in the second iteration.

The computer then proceeds to step 52 and selects a frequency for Cell B based on carrier-to-interference information. Since there are no frequencies assigned to any of the cells, there are no carrier-to-interference restrictions. Hence, any of frequencies w, x, y or z would be suitable. As illustrated in FIG. 19, the computer selects frequency w since frequency w is the lowest available frequency.

At this point, frequency w is deemed to have been assigned to Cell B. Accordingly, as illustrated in FIG. 20, Cell B now needs only 1 more frequency, and since the minimum separation requirement of Cell A is 3, frequencies w, x and y are not available for further assignment to Cell B, and the number of frequencies available to Cell B is 1. Since the separation requirement between Cell A and Cell B is 1, frequency w is not available for further assignment to Cell A, and the number of frequencies available to Cell A is 3.

The computer then proceeds to step 54 and determines whether there are any cells of the network that need frequencies, and whether there are frequencies available for those cells. As illustrated in FIG. 20, each cell needs at least one frequency and there are available frequencies for each cell. Hence, the answer is "yes" to both questions, so the computer loops back to step 50 for a second "pass".

As illustrated in FIG. 3, the computer performs steps 60 and 62 of steps 50 and 51 illustrated in FIG. 2. In particular, the computer calculates new difficulty factors for each cell, as illustrated in FIG. 21, and selects the cell with the worst difficulty factor. Accordingly, as illustrated in FIG. 21, the computer selects Cell B, again.

In step 52, the computer selects frequency z for Cell B since frequency z is the only available frequency for Cell B. Hence, frequency z has now been assigned to Cell B.

In step 54, it is determined that there is a cell in the network that needs a frequency and that the cell has at least one available frequency. In particular, as illustrated in FIG. 22, Cell A and Cell C each need two frequencies, and both Cell A and Cell C have available frequencies. Accordingly, step 54 proceeds to step 50, for a third "pass".

If the method is continued, it completes after the second iteration. Each cell is assigned two frequencies, as illustrated in FIG. 23. In particular, frequencies x and y are assigned to Cell A and Cell C, and frequencies w and z are assigned to Cell B. The successful assignment of frequencies is at least partly attributed to the prioritizing of Cell B above Cell A so that frequency assignments are made to Cell B before Cell A. This prioritization was accomplished by updating the adjustment factors such that Cell B had a worse difficulty factor.

If the second iteration had been unsuccessful in fulfilling the needs of each cell, the computer would have performed another iteration. If, after a predetermined number of iterations, the computer determined that sum of all unfilled needs over all the cells diverged with each iteration, the computer would then modify the global scaling factor S (e.g., increment the global scaling factor by 1), and perform another iteration.

Tests have been performed using the invention to assign frequencies in a network consisting of a midsized urban area. As illustrated in FIG. 24, the invention provides an increase in the maximum number of assignments in the network, an increase in average carrier-to-interference ratios, a decrease in C/I variability, and an improvement in the worst C/I.

It should be understood that the method of the present invention can be performed on a periodic basis, such as every six months, to generate new frequency assignments for a cellular network. As conditions such as connection demand change within the cells, the variables used during the method can be modified, and the method can be rerun using the updated conditions.

In one embodiment, the machine that performs the method is independent of the hardware of the cellular network itself. In another embodiment, the machine that performs the method is connected to the hardware of the cellular network such that newly generated frequency assignments can be distributed to the network's hardware automatically.

Having thus described particular embodiments of the invention, various alterations, modifications, and improvements will readily occur to those skilled in the art. Such alterations, modifications, and improvements are intended to be part of this disclosure, and are intended to be within the scope of the invention. Accordingly, the foregoing description is by way of example only and is not intended as limiting. The invention is limited only as defined in the following claims and the equivalents thereto.

What is claimed is:

1. A method for assigning frequencies to a plurality of cells in a cellular network, comprising the steps of:
    generating a difficulty factor for each cell, wherein each cell's difficulty factor is based on a number of available frequencies for that cell, and wherein the number of available frequencies for that cell is a variable number that can vary as frequencies are selected for cells in the cellular network, wherein each cell requires a predetermined number of frequencies to be selected for that cell, and wherein the step of generating a difficulty factor includes a step of determining each cell's difficulty factor based on the predetermined number of frequencies required to be selected for that cell, the number of available frequencies for that cell, and an adjustment factor for that cell, wherein each cell's adjustment factor is indicative of a relative level of difficulty in selecting the required predetermined number of frequencies for that cell during a previous assignment attempt;
    selecting a cell from the plurality of cells based on each cell's difficulty factor;
    selecting a frequency for the selected cell from the available frequencies for that cell; and
    repeating the steps of generating a difficulty factor, selecting a cell and selecting a frequency, to assign the frequencies to the plurality of cells in the cellular network.

2. The method of claim 1, further comprising a step of:
    following an unsuccessful attempt to assign frequencies to the plurality of cells, updating each cell's adjustment factor to represent the relative difficulty in selecting frequencies for that cell during the unsuccessful attempt, unselecting all of the selected cells and all of the selected frequencies for the selected cells, and re-performing the steps of generating a difficulty factor, selecting a cell, selecting a frequency, and repeating.

3. The method of claim 2, wherein the step of updating, unselecting and re-performing is performed only when at least one of the plurality of cells requires at least one more frequency and there are no frequencies available for use by that cell.

4. The method of claim 1, wherein the step of selecting the frequency for the selected cell includes the steps of:
    determining a carrier-to-interference ratio for each of the selected cell's available frequencies; and
    choosing, from the selected cell's available frequencies, a frequency having the largest determined carrier-to-interference ratio, as the selected frequency for the selected cell.

5. The method of claim 4, wherein the step of determining the carrier-to-interference ratio includes the steps of:
    providing, for each of the selected cell's available frequencies, a plurality of carrier-to-interference ratios between the selected cell and the other cells; and
    picking the minimum carrier-to-interference ratio of the plurality of carrier-to-interference ratios as the determined carrier-to-interference ratio.

6. The method of claim 1, further comprising a step of:
    determining each cell's number of available frequencies based on a carrier-to-interference ratio, specific to that cell, for each frequency of a pool of frequencies.

7. The method of claim 1, further comprising a step of:
    determining each cell's number of available frequencies based on a separation constraint, specific to that cell, for each frequency of a pool of frequencies.

8. A method for assigning frequencies to a plurality of cells in a cellular network, wherein each cell requires a predetermined number of frequencies to be selected for that cell, comprising the steps of:
    generating a difficulty factor for each cell, wherein each cell's difficulty factor is based on an adjustment factor for that cell, and wherein, following a first assignment attempt, each cell's adjustment factor is indicative of a relative level of difficulty in selecting the required predetermined number of frequencies for that cell during the first assignment attempt;

selecting a cell from the plurality of cells based on each cell's difficulty factor;

selecting a frequency from the available frequencies for the selected cell;

when at least one of the plurality of cells requires at least one more frequency and there is at least one frequency available for use by that cell, repeating the steps of generating a difficulty factor, selecting a cell and selecting a frequency; and when at least one of the plurality of cells requires at least one more frequency and there are no frequencies available for use by that cell, updating each cell's adjustment factor to represent the relative difficulty in selecting frequencies for that cell during a second assignment attempt, unselecting all of the selected cells and all of the selected frequencies for the selected cells, and re-performing the steps of generating a difficulty factor, selecting a cell, selecting a frequency, as the second assignment attempt.

9. The method of claim 8, wherein the step of generating a difficulty factor includes a step of:

determining each cell's difficulty factor based on the predetermined number of frequencies required to be selected for that cell, the adjustment factor for that cell, and a number of available frequencies for that cell, wherein the number of available frequencies for that cell is a variable number that can vary as frequencies are selected for cells in the cellular network.

10. The method of claim 9, further comprising a step of:

determining each cell's number of available frequencies based on a carrier-to-interference ratio, specific to that cell, for each frequency of a pool of frequencies.

11. The method of claim 8, wherein the step of selecting the frequency for the selected cell includes the steps of:

determining a carrier-to-interference ratio for each of the selected cell's available frequencies; and choosing, from the selected cell's available frequencies, a frequency having the largest determined carrier-to-interference ratio, as the selected frequency for the selected cell.

12. The method of claim 11, wherein the step of determining the carrier-to-interference ratio includes the steps of:

providing, for each of the selected cell's available frequencies, a plurality of carrier-to-interference ratios between the selected cell and the other cells; and picking the minimum carrier-to-interference ratio of the plurality of carrier-to-interference ratios as the determined carrier-to-interference ratio.

13. A computerized apparatus for assigning frequencies to a plurality of cells in a cellular network, the computerized apparatus comprising:

an input/output device;

memory, coupled to the input/output device, wherein the memory stores, at least temporarily, a computer program; and a processor, coupled to the input/output device and the memory, wherein the processor executes the computer program in response to a command from the input/output device, the computer program comprising:

means for generating a difficulty factor for each cell, wherein each cell's difficulty factor is based on a number of available frequencies for that cell, and wherein the number of available frequencies for that cell is a variable number that can vary as frequencies are selected for cells in the cellular network, wherein each cell requires a predetermined number of frequencies to be selected for that cell, and wherein the means for generating a difficulty factor includes means for determining each cell's difficulty factor based on the predetermined number of frequencies required to be selected for that cell, the number of available frequencies for that cell, and an adjustment factor for that cell, wherein each cell's adjustment factor is indicative of a relative level of difficulty in selecting the required predetermined number of frequencies for that cell during a previous assignment attempt;

means for selecting a first cell from the plurality of cells based on each cell's difficulty factor, and a frequency for the selected first cell from the available frequencies for the selected first cell; and means for selecting a new cell from the plurality of cells based on each cell's difficulty factor, and a frequency for the selected new cell, wherein the new cell is one of the first cell and a second cell.

14. The computerized apparatus of claim 13, wherein the computer program further comprises:

means, responsive to an unsuccessful attempt to assign frequencies to the plurality of cells, for updating each cell's adjustment factor to represent the relative difficulty in selecting frequencies for that cell during the unsuccessful attempt, and unselecting all of the selected cell's and all of the selected frequencies for the selected cells, so that the computer program can perform a new attempt to assign frequencies to the plurality of cells.

15. The computerized apparatus of claim 13, wherein the means for selecting the frequency for the selected cell includes:

means for determining a carrier-to-interference ratio for each of the selected cell's available frequencies; and means for choosing, from the selected cell's available frequencies, a frequency having the largest determined carrier-to-interference ratio, as the selected frequency for the selected cell.

16. The computerized apparatus of claim 15, wherein the means for determining the carrier-to-interference ratio includes:

means for providing, for each of the selected cell's available frequencies, a plurality of carrier-to-interference ratios between the selected cell and the other cells; and means for picking the minimum carrier-to-interference ratio of the plurality of carrier-to-interference ratios as the determined carrier-to-interference ratio.

17. The computerized apparatus of claim 13, wherein the computer program further comprises:

means for determining each cell's number of available frequencies based on a carrier-to-interference ratio, specific to that cell, for each frequency of a pool of frequencies.

* * * * *